United States Patent [19]

Pieket Weeserik

[11] Patent Number: 4,982,190
[45] Date of Patent: Jan. 1, 1991

[54] DIGITAL ARRANGEMENT HAVING FOR ITS OBJECT TO SHUNT GROUND SEPARATIONS AT VIDEO CIRCUITS

[75] Inventor: Pieter C. Pieket Weeserik, Hilversum, Netherlands

[73] Assignee: AT&T Bell Laboratories, Murray Hill, N.J.

[21] Appl. No.: 277,627

[22] Filed: Nov. 30, 1988

[30] Foreign Application Priority Data

Nov. 30, 1987 [NL] Netherlands ............................ 8702860

[51] Int. Cl.$^5$ .......................... H03M 1/00; H04N 9/64
[52] U.S. Cl. ...................................... 341/110; 341/118; 341/126; 358/21 R
[58] Field of Search .......................... 341/126, 118, 110; 358/21 R, 23, 160, 443

[56] References Cited

U.S. PATENT DOCUMENTS 4,736,238  4/1988  Moriyama et al. .................... 358/23

OTHER PUBLICATIONS

Hornung et al., "Aufbereitung von Fernsehsignalen fur 140 Mbits/s-Verbindungen", Telecom Report 10, 1987.

Primary Examiner—William M. Shoop, Jr.
Assistant Examiner—Sharon D. Logan
Attorney, Agent, or Firm—Lucian C. Canepa

[57] ABSTRACT

Digital circuit for shunting a ground separation plane, formed, for example, by a transformer, and present in a digital signal path. In this circuit a long sequence of equal bits offered to one side of such a ground separation plane must be conveyed further at the other side as a replica of said first bit sequence. Such sequences in essence represents a direct current. According to the invention, there is provided at the ingoing end of such a ground separation plane a modulator for up-modulating a bit stream applied thereto on a carrier frequency for which the ground separation plane is transparent. At the discharge end of the ground separation plane a demodulator is provided for down-modulation in such manner that a replica is obtained of the bit stream applied to the digital modulator. For such a modulator and such a demodulator use can be made of an XOR-gate or a D-flip-flop, respectively.

A preferred use of the invention relates to a video circuit with A/D and D/A conversion, respectively.

4 Claims, 2 Drawing Sheets

DIGITAL ARRANGEMENT HAVING FOR ITS OBJECT TO SHUNT GROUND SEPARATIONS AT VIDEO CIRCUITS

BACKGROUND OF THE INVENTION

The invention relates to a video circuit including a conversion unit which has for its object to convert, under the control of a clock signal, an analog signal or a digital signal, respectively, whilst preserving the information contained therein, into a digital or an analog signal, respectively; and separation means for producing a galvanic separation from ground in the video circuit.

Such a video circuit is described in an article "Aufbereitung von Fernsehsignalen für 140Mbit/s-Verbindungen" by F. Hornung and F. Schalamon, published in Telcom Report 10 1987, special: "Multiplex- und Leitungseinrichtungen".

Such a video circuit is frequently used to preprocess a video signal applied thereto either as an analog signal or as a digital signal to give it a shape appropriate for further processing to or from a transmission circuit.

To avoid hum in the video circuit, it is customary to provide a galvanic separation from ground, in order to create "floating" video inputs.

To that end, in accordance with the above prior art a separation transformer is arranged between a video signal source, for example a video camera, and the input of a video circuit. Such a proposed solution has the drawback that such a ground separation transformer must be capable of transmitting the signal at base-band level. Such a requirement is an impediment to a cost-effective solution of the ground separation problem.

The invention has for its object to obviate the above drawback.

SUMMARY OF THE INVENTION

Within the scope of the present invention, the basic idea is to provide, different from the above-mentioned technique, a ground separation plane in those positions in the circuit in which a video signal is present in the digital form. More specifically, such a ground separation plane is then provided at the output of a converter unit, in the present case an analog-to-digital converter (transmitting section of the circuit) and, optionally, at the input of a converter unit, in the present case a digital-to-analog converter (receiving section of the circuit).

All this implies that for each bit stream path as the output or input, respectively, of an analog-to-digital converter or a digital-to-analog converter, respectively, comparatively long sequences of consecutive "zeros" or "ones" may occur, which are to be transferred via the relevant inductive ground separation plane. As it is a requirement that the n-bit words which are present at the output and input, respectively, of the respective analog-to-digital and digital-to-analog converters, and each represent a sample of a relevant video signal, after having passed through the ground separation plane present in their path, are ultimately available for further processing without bit distortion, it is imperative that such a ground separation plane is completely bit-transparent.

According to the invention, a video circuit is therefore characterized in that the separation means for each bit stream path connected to a relevant converter unit include a separation member, for example a separation capacitor, incorporated in such a bit stream path; and that such a bit stream path further includes:

(a) at one side of the relevant separation member a modulation unit for up-modulating a bit stream applied thereto on a carrier frequency for which the separation member is transparent, (b) at the other side of the relevant separation member, a demodulation unit for down-modulation of the bit stream applied thereto, more specifically in such manner that this downwardly modulated bit stream is a faithful replica of the bit stream applied to the modulation unit.

A video circuit according to the invention is more specifically characterized in that said modulation unit is constituted by an XOR-gate driven by said clock signal; and said demodulation unit is constituted by a buffer clocked by a phase-shifted version of said clock signal.

More specifically, a pulse transmission circuit having the aforedescribed characterizing features can be used for the transparent transmission of pulse sequences in which long subsequences of consecutive "zeros" or "ones" may occur, over a path including a galvanic separation.

BRIEF DESCRIPTION OF THE DRAWINGS

The invention will now be described by way of example on the basis of an embodiment which is illustrative of the invention and with reference to the accompanying drawing in which.

DESCRIPTION OF THE PREFERRED EMBODIMENTS

Figure 1:
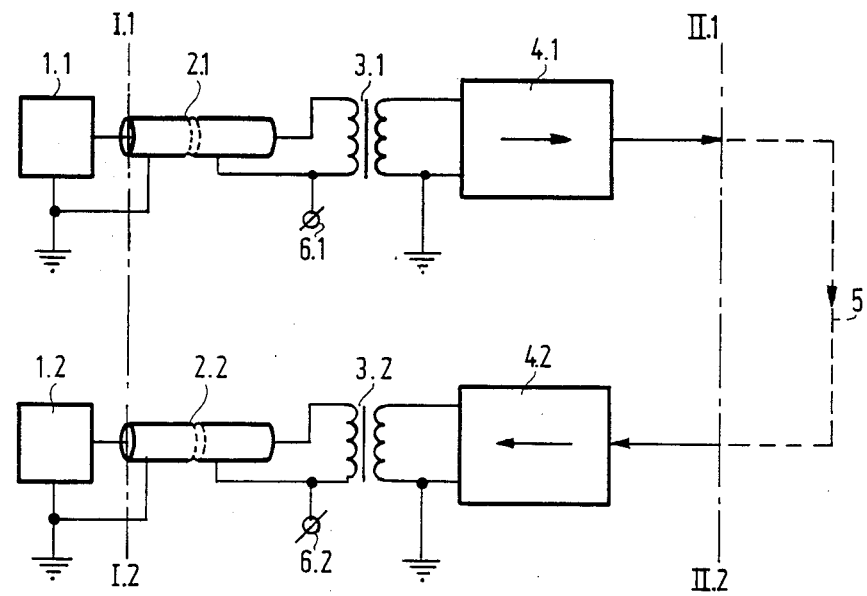
FIG. 1 is a circuit diagram of a circuit configuration in which induced noise interferences such as hum can be counteracted by means of two ground separation planes.

The circuit configuration shown schematically in FIG. 1 is an embodiment which is illustrative of the circuit design in which the invention may be used of the invention. Such a configuration comprises a signal source 1.1, for example a video camera; a video cable 2.1 having for its object to convey a signal applied by this signal source, to a video signal part present in the area of this source; 3.1 and 3.2, respectively, a first and a second ground separation transformer, respectively; a signal processing system 4.1 and 4.2, respectively of the transmitter section and the receiver section, respectively, of the video circuit, which system will be described in greater detail with reference to FIG. 2; a video transmission system 5 which can transmit a video signal processed at the transmitter end of the video circuit via a transmission medium (coaxial cable, fibre optic cable, the ether) to a comparatively remote section at the receiver end of the video circuit; a signal user set 1.2, such as, for example, a video receiver; a video cable 2.2 serving to convey the signal applied by the second ground separation transformer to the signal user set; a first interface I.1 provided at the transmitter end which constitutes a coupling between the signal source 1.1 and the video cable 2.1; and a second interface II.1 present at the transmitter end constituting a coupling between the system 4.1 and the transmission system 5; a first interface I.2 present at the receiver end which constitutes a coupling between the video cable 2.2 and the user set 1.2; and a second interface II.2 present at the receiver end constituting a coupling between the transmission system 5 and the system 4.2.

In a situation which is illustrative of the practical use, the video cable, for example 2.1 (which may have a length of, for example, 100 to 200 mtres.) is provided together with one or more further cables, for example cables conveying electricity, in the same cable duct. Such neighbouring cables induce significant noise voltages in the relevant video cable, such as, for example, 50 Hz hum voltages. The disturbing influence thereof on the useful video signal can be eliminated by forming a ground separation plane. In the embodiment shown in FIG. 1 such a ground separation plane is implemented by a ground separation transformer such as 3.1. When the terminal such as 6.1 is "floating", in other words when it is not connected to ground potential, noise voltages induced in the video cable 2.1 will not have any disturbing influence on the useful signal applied to the system 4.1. In a similar manner any noise voltages induced in the video cable 2.2 at the receiver end will not disturb the useful video signal received by the user system, if the terminal point 6.2 is "floating".

Usually one single ground separation plane which is then as a rule provided at the transmitter end of the relevant connecting channel between source and user will be sufficient.

The above-mentioned article "Aufbereitung von Fernsehsignalen für 140-Mbit/s Verbindungen" discloses that a ground separation transformer comparable to said separation transformer 3.1 is connected between a video signal source, for example a video camera, and the input of a video circuit, more specifically a clamping amplifier provided at the input side of this video circuit.

Such a ground separation transformer must be capable of transmitting a video signal at baseband level (0–6 MHz). Such a requirement implies that the implementation of such a ground separation transformer will be comparatively costly and difficult. The cross-inductance introduced by such a ground separation transformer must be dimensioned for a lowest frequency of, for example, 0.1 Hz. This is objectionable from the constructional and cost point of view; in addition special attention must be paid to provisions ensuring the quality of the transmission properties in this circuit section, more specifically as regards the upper part of the 0–6 MHz band.

Within the scope of the description of the present invention, in a connecting path between a signal source provided at the transmitter end and a signal user set provided at the receiver end which are coupled by means of a transmission system which may include, for example, a coaxial cable or an optical fibre cable, that part of the path that is interposed between the first and second interfaces such as I.1 and II.1 (transmitter end) and I.2 and II.2 (receiver end) is denoted as the video circuit. It is usually desirable to transmit the relevant signals in their digitized form and serially via the transmission means (for example a coaxial cable, an optical fibre cable or the ether) of the transmission system. This implies that a video circuit present at the transmitter end must incorporate an A/D converter and a multiplexer and a video circuit present at the receiver end must comprise a D/A converter and a demultiplexer.

Within the scope of the present invention it is possible to provide a ground separation plane in the video circuit at the transmitter end and, optionally, in the video circuit provided at the receiver end. More specifically, to that end such a ground separation plane is formed between the output end of the A/D converter and the multiplexer provided in the video circuit, and optionally between the input end of the D/A converter and the demultiplexer present in the video circuit.

In a practical implementation such a ground separation plane is created between every physical output of the A/D converter and the corresponding physical input of the multiplexer added thereto, and also optionally between every physical input of a D/A converter and the corresponding output of the demultiplexer added thereto, by providing a series capacitor.

When a digitized video signal is conveyed, long sequences of consecutive equal-value bits will be present at each output and input, respectively, of such an A/D converter and D/A converter, respectively. Since the connecting path between the A/D converter of the video circuit at the transmitter end and the D/A converter at the receiver end must be transparent, it is a requirement that the integrity of the multi-bit words appearing in the parallel form at the output of an A/D converter, which each represent a sample of the video signal, is preserved, in spite of the presence of ground separation capacitors in their path to the input of the D/A converter provided in the receiver station. In other words, in the event of a large number of consecutive video signal samples, equal bit positions of which contain the same bit values, each stream of equal bits appearing for every individual A/D-converter output, i.e. a direct current, must be applied undistorted to the corresponding, individual D/A-converter input of the receiver station.

Figure 2A:
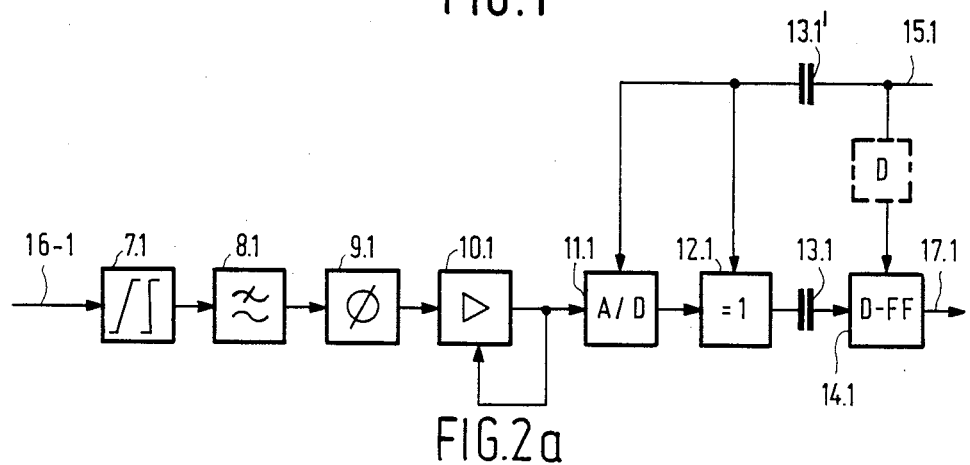
FIGS. 2a and 2b are circuit diagrams of an embodiment of the invention and illustrates the manner in which a ground separation plane at the transmitter end and, optionally, also at the receiver end of a circuit can be implemented.
Figure 2B:
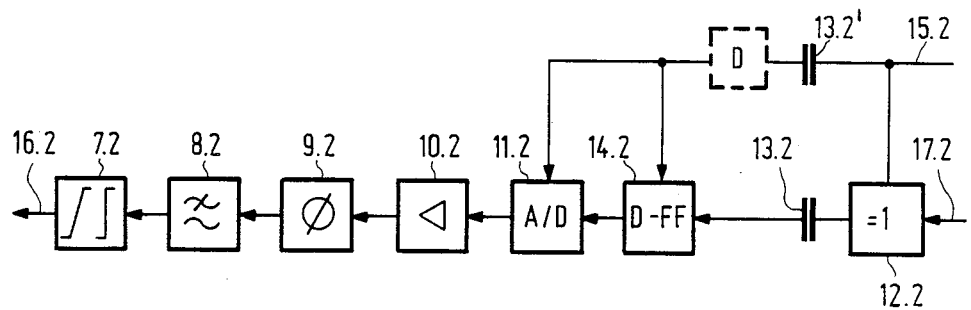

A solution of this problem is shown diagrammatically in FIGS. 2a and 2b as an embodiment of the present invention.

The diagrams shown in FIGS. 2a and 2b are illustrative embodiments of the invention such as it is used in the respective blocks of a connecting path of the type described in the foregoing.

FIGS. 2a and 2b show and indicate the following components: a video equalizer 7.1 and 7.2, respectively; a low-pass filter (0–6 MHz) 8.1 and 8.2, respectively; a group-delay equalizer 9.1 and 9.2, respectively; a clamping amplifier 10.1; an amplifier 10.2; an A/D converter 11.2; a bit sequence modulator 12.1 and 12.2, respectively; a ground separation capacitor 13.1, 13.1' and 13.2, 13.2', respectively; a bit sequence demodulator 14.1 and 14.2, respectively; and a clock signal channel 15.1 and 15.2, respectively.

In the Figure, an analog-video signal input and an analog video signal output are denoted by the respective arrows 16.1 and 16.2, whilst a digital video signal output and a digital video signal input are denoted by the respective arrows 17.1 and 17.2. For the sake of completeness, it should be noted that every digital output and digital input, respectively of the respective A/D and D/A converters, is included in a series circuit formed by a bit sequence modulator, for example 12.1 and 12.2, respectively, a separation capacitor, for example 13.1 and 13.2, respectively and also a bit sequence demodulator for example 14.1 and 14.2, respectively. In other words, if a video signal sample is represented by an n-bit word, wherein n is, for example, equal to 8 or 9, such series circuits are added to each converter, for example 11.1 and 11.2, respectively. The inputs such as 16.1 and the output 16.2, respectively are as a rule coupled to a video cable via an interface; the output such as 17.1 and the input such as 17.2, respectively are coupled to a multiplexer or a demultiplexer, respectively.

Each video signal or each n-bit word remains available during an interval corresponding to one period of a clock signal as applied via the path such as 15.1 and 15.2, respectively. Each bit sequence modulator, for example 12.1 is arranged for up-modulating a sequence of bits applied thereto, each bit being a constituent part of consecutively appearing video signal samples, to a frequency level as given by the frequency $f_{cl}$ of the clock signal. This means that a sequence of consecutive bits of equal values are converted via such a modulator into a sequence of consecutive bits of unequal values. More specifically, a relatively long sequence of consecutive "zeros" and "ones", respectively, will appear at the output of such a demodulator as a replica of the relevant clock signal or a phase-shifted version of this signal, respectively. In this situation the ground separation capacitor is dimensioned such that it is transparent to frequencies $\geq \frac{1}{2}.f_{cl}$. The clock signal frequency $f_{cl}$ when used in the field of application described will here generally exceed approximately 13 MHz. This means that simple and cheap types, such as for example ceramic capacitors can be used as the ground separation capacitors. A bit sequency demodulator such as 14.1 or 14.2, respectively, is connected to the other side of the ground separation capacitor. Such a bit sequence demodulator is arranged for down modulation of a bit stream applied to it, in such manner that such a down-modulated bit stream is a faithful replica of the corresponding bit stream applied to the bit sequence modulator.

Such a bit sequence modulator is, for example, in the form of an XOR gate, whilst such a bit sequence demodulator is, for example, in the form of a D-type flip-flop.

Figure 3:
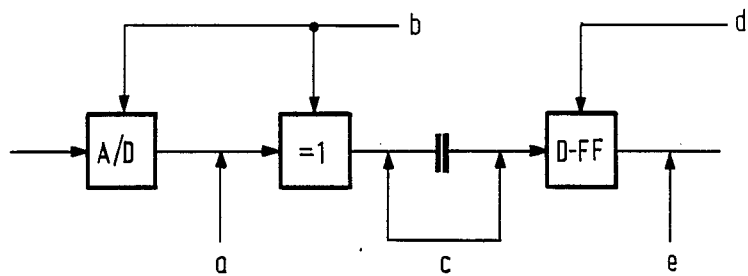
FIG. 3 is a simplified circuit diagram of FIG. 2a, which FIG. 3 further includes indication labels.
Figure 3A:
FIGS. 3a–3e shows a number of waveforms, to illustrate the mode of operation at the different locations of the embodiment of FIG. 3.
Figure 3B:
Figure 3C:
Figure 3D:
Figure 3E:

The mode of operation of the series circuit described in the foregoing comprising a bit sequence modulator or an XOR-gate such as 12.1, a ground separation capacitor such as 13.1 and a bit sequence demodulator or D-flip-flop, such as 14.1, is illustrated in FIG. 3, and in the pulse diagrams of FIGS. 3a, 3b, 3c, 3d and 3e. FIG. 3 shows in which locations of the above said series circuit the signal forms indicated in FIG. 3a to 3e inclusive, can be found. For example, the signal forms in FIG. 3a represents the signal form appearing at location "a" in FIG. 3.

Each signal bit as a constituent part of a videosignal sample remains available during a time interval T, wherein $T=1/f_{cl}$. This is illustrated by the pulse diagram 3a. The clock signal operative for sampling is illustrated by the pulse diagram 3b and this clock signal is also used for driving the bit sequence modulator. The bit sequence, for example as denoted by "a", which is up-modulated by such a bit sequence modulator is illustrated by pulse diagram 3c. A bit sequence derived thus from the bit sequence "a" passes predominantly undistortedly through the ground separation capacitor in spite of the presence of a plurality of consecutive "zeros" and a plurality of "ones" in the bit sequence a.

The associated bit sequence demodulator is driven by a clock signal which is illustrated by the pulse diagram 3d. This clock signal is phase-shifted relative to the clock signal b in such a way that an upwardly directed edge occurs in each interval in which the clock signal is "low", as a result of which the bit value of the sequence c is equal to that of the sequence a. Thus, the up-modulated bit sequence c is modulated downwardly again so that ultimately a bit sequence is obtained as illustrated by 3e. From a and e it appears that said last bit sequence is From a and e it appears that said last bit sequence is a phase-shifted replica of the first-mentioned bit sequence.

A series circuit present at the receiver end comprising the components such as 12.2 and 13.2 and 14.2 operates in a similar manner.

Thus, any ground separation (ground separation capacitor) can be shunted by utilizing an associated XOR-gate, more specifically because such a signal bit sequence is modulated such that actually no d.c. component must pass the ground separation capacitor.

Thus, the present invention provides an economically attractive and efficient solution for the outlined problem. To create the desired ground separation planes simple and inexpensive means can be used without it being necessary to use numerous communication transformers for such a ground separation.

The use of the invention is not limited to the embodiment described in the foregoing. The invention can more particularly be used for the transparent transmission of pulse sequences in which relatively long sub-sequences of consecutive equal bits may occur, via a path in which direct current blocking or galvanic separation occurs.

What is claimed is:

1. A video circuit including a conversion unit, said conversion unit converting, under the control of a clock signal, an analog signal or a digital signal, into a digital or an analog signal, respectively, while preserving the information contained within said analog or digital signal, and separation means for producing a galvanic separation from ground in the video circuit, characterized in that the separation means for each bit stream path connected to said converter unit include a separation member, and said bit stream path incorporates said separation member and includes:

(a) at one side of the separation member a modulation unit for up-modulating a bit stream applied thereto on a carrier frequency for which the separation member is transparent, (b) at the other side of the separation member, a demodulation unit for down-modulation of the bit stream applied thereto, more specifically in such manner that this downwardly modulated bit stream is a faithful replica of the bit stream applied to the modulation unit.

2. A video circuit as claimed in claim 1, characterized in that said modulation unit is constituted by an XOR-gate driven by said clock signal; and said demodulation unit is constituted by a buffer clocked by a phase-shifted version of said clock signal.

3. A video circuit as claimed in claim 1 or claim 2, further characterized in that said video circuit includes a pulse transmission circuit, said transmission circuit being used for the transparent transmission of pulse sequences in which long sub-sequences of consecutive "zeros" or "ones" may occur, over a path including a galvanic separation.

4. A video circuit as claimed in claim 1 further characterized in that said separation means is a separation capacitor.

* * * * *